United States Patent
Lee et al.

(10) Patent No.: US 8,369,117 B2
(45) Date of Patent: Feb. 5, 2013

(54) POWER CONVERSION SYSTEM FOR ELIMINATING LOW FREQUENCY RIPPLE CURRENT AND CONTROL METHOD THEREOF

(75) Inventors: Byoung Kuk Lee, Gyeonggi-do (KR); Jong Soo Kim, Gyeonggi-do (KR); Hyun Soo Kang, Seoul (KR); Gyu Yeong Choe, Gyeonggi-do (KR)

(73) Assignee: Sungyunkwan University Foundation for Corporate Collaboration, Gyeonggi-Do (KR)

( * ) Notice: Subject to any disclaimer, the term of this patent is extended or adjusted under 35 U.S.C. 154(b) by 614 days.

(21) Appl. No.: 12/631,941

(22) Filed: Dec. 7, 2009

(65) Prior Publication Data

US 2010/0142236 A1    Jun. 10, 2010

(30) Foreign Application Priority Data

Dec. 9, 2008    (KR) .................... 10-2008-0124507

(51) Int. Cl.
*H02M 1/00*    (2007.01)
*H02M 7/757*    (2006.01)
(52) U.S. Cl. .......................................... 363/78; 363/79
(58) Field of Classification Search .................... 363/74, 363/78, 79
See application file for complete search history.

(56) References Cited

U.S. PATENT DOCUMENTS

| 2005/0125319 A1* | 6/2005 | Johnson | 705/30 |
| 2010/0057267 A1* | 3/2010 | Liu et al. | 700/297 |

* cited by examiner

*Primary Examiner* — Jue Zhang
(74) *Attorney, Agent, or Firm* — Pearne & Gordon LLP

(57) ABSTRACT

There is provided an integrated control method for eliminating a low frequency ripple in a power conversion system for a fuel cell, more particularly, a control method of a power conversion system capable of eliminating a low frequency ripple, controlling a DC link voltage, and controlling an output power and a system using the same control method. A power conversion system (PCS) that converts an output of a DC power supply received from an external power supply includes a converter that converts a voltage of the input power supply; an inverter that converts an output voltage of the converter into an AC voltage; and a converter control module that outputs a PWM signal for controlling a switch of the converter, and after receiving a power instruction value, the converter control module generates the PWM signal for controlling the converter based on the power instruction value.

15 Claims, 7 Drawing Sheets

POWER CONVERSION SYSTEM FOR ELIMINATING LOW FREQUENCY RIPPLE CURRENT AND CONTROL METHOD THEREOF

FIELD OF THE INVENTION

The present disclosure relates to an integrated control method for eliminating a low frequency ripple in a power conversion system for a fuel cell. To be more specific, the present disclosure relates to a control method of a power conversion system capable of eliminating a low frequency ripple, controlling a DC link voltage, and controlling an output power and a system using the same control method.

BACKGROUND OF THE INVENTION

Recently, there has been an increasing interest in an environment-friendly power generation method due to an increase in power needs caused by a rapid industrial development, and concerns about an environmental pollution grown out by global warming and about an exhaustion of fossil energy.

The environment-friendly power generation method includes a fuel cell power generation method, a solar photovoltaic power generation method, a wind power generation method, and the like. In particular, the fuel cell power generation method is a representative example of the environment-friendly power generation method in that conditions for generating the fuel cell power are not much restricted as compared to the solar photovoltaic power and the wind power. Further, the fuel cell itself is environment-friendly, and little noise is made at the time of generation of the fuel cell power. An output power of the fuel cell is converted to be suitable for a load and supplied to the load or an electric power system line. Such a process necessarily requires a power conversion system (PCS).

Figure 1:
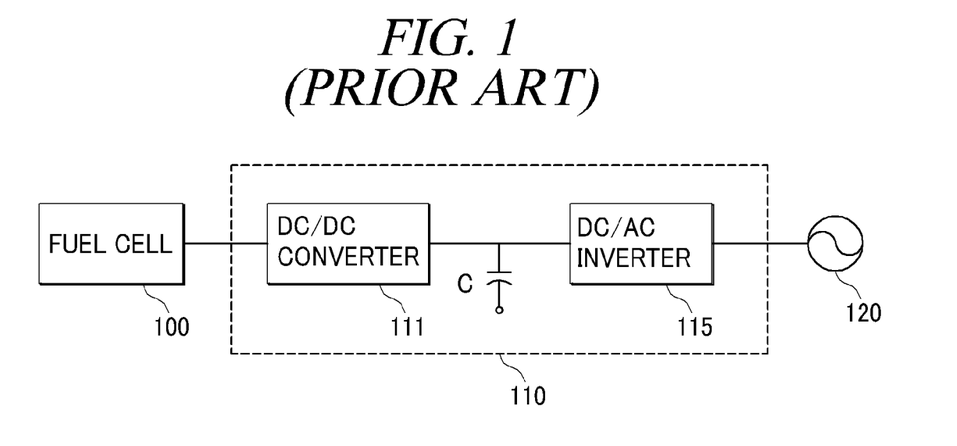
FIG. 1 is a block diagram showing a configuration of a conventional fuel cell system.

FIG. 1 is a block diagram showing a configuration of a conventional fuel cell system.

As shown in FIG. 1, the conventional fuel cell system is made up of a fuel cell 100, a power conversion apparatus 110, and a load 120. The power conversion apparatus 110 includes a DC/DC converter 111 (hereinafter, referred to as "converter"), and a DC/AC inverter 115 (hereinafter, referred to as "inverter").

As described above, the power conversion apparatus 110 receives a power from the fuel cell 100, suitably converts the power, and supplies the converted power to the load 120.

In this process, the DC/DC converter 111 boosts and outputs a DC voltage generated from the fuel cell 100.

Then, the DC/AC inverter 115 converts the DC voltage outputted from the DC/DC converter 111 into an AC voltage and applies the AC voltage to each load.

In order to supply the output power of the fuel cell having a low voltage•high current output characteristics to a general electric power system, a boost-type DC/DC converter and a single- or three-phase DC/AC inverter are necessarily required. However, the single-phase inverter and the three-phase inverter inevitably generate low frequency ripple components having a frequency of about 120 Hz two times higher than an output fundamental frequency and a frequency of about 360 Hz six times higher, respectively, due to a rectification effect caused by the configuration of the inverter, and the low frequency ripple components are reflected and returned to the fuel cell.

Figure 2A:
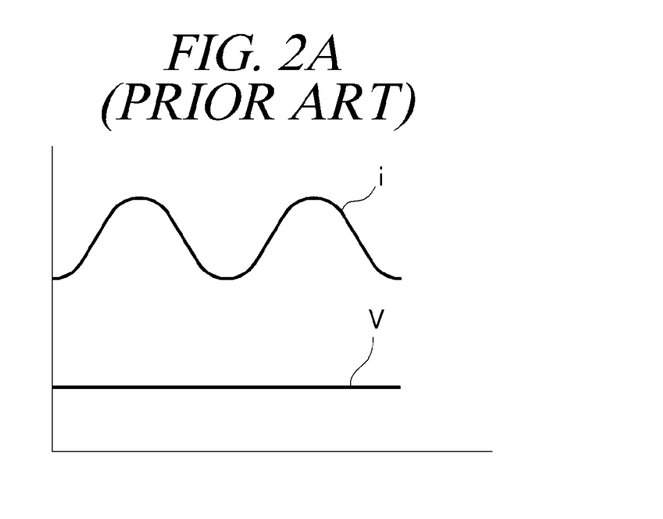
FIGS. 2A to 2C are graphs showing voltage and current values measured at each section of a conventional power conversion apparatus.
Figure 2B:
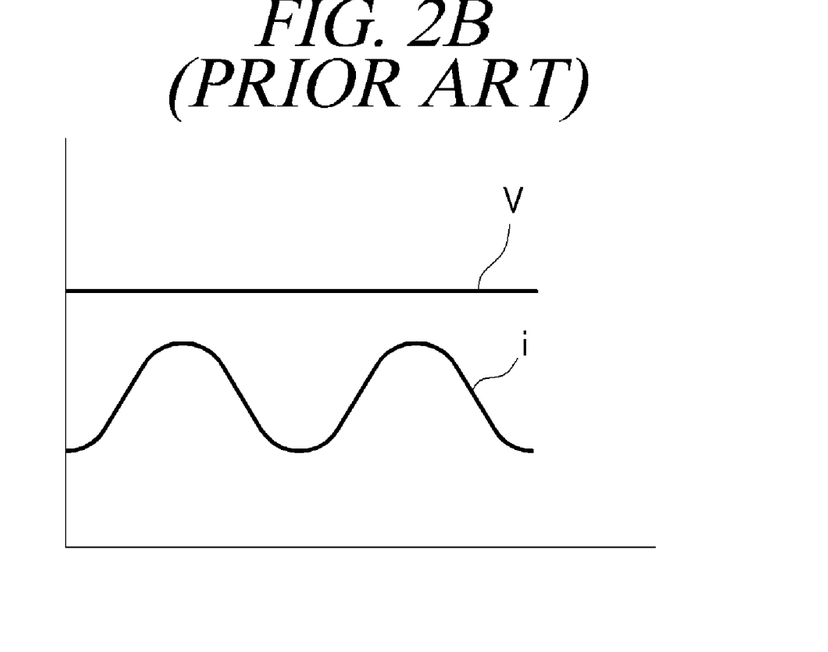
Figure 2C:
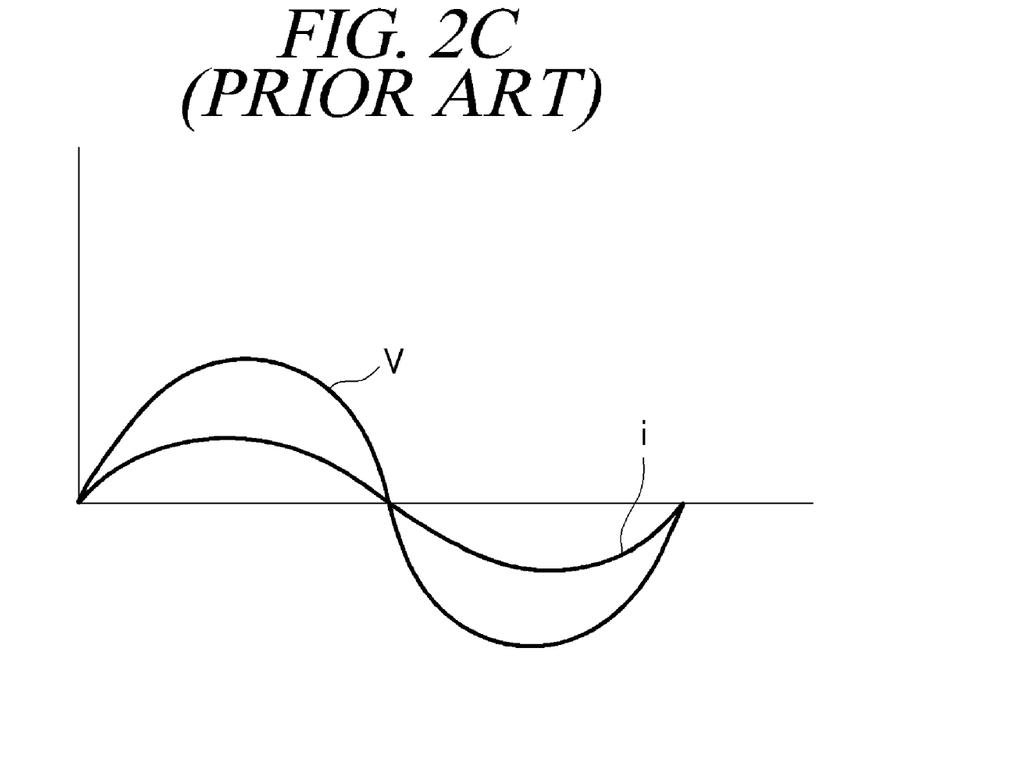

FIGS. 2A to 2C are graphs showing voltage and current values measured between the fuel cell 110 and the converter 111, between the converter 111 and the inverter 115, and after passing through the inverter 115, respectively.

As shown in FIGS. 2A to 2C, it can be seen that before passing through the converter, a voltage of the fuel cell is a low voltage but it is boosted into a high voltage through the converter and converted into an AC voltage through the inverter.

As shown in FIG. 2C, the output voltage and current are converted to have AC components through the inverter, so that the power calculated by multiplying a voltage and a current has a frequency component two times higher than a frequency of the voltage and the current. Generally, a DC link voltage is controlled to a constant value, so that a DC link current momentarily has the same value by the principle of the conservation of energy, thereby inevitably containing the AC components. The power is the same in the above-described three sections and resultantly has a form of an alternating current like the current as shown in FIGS. 2A and 2B.

That is, it can be seen from the FIG. 2A that as for the conventional power conversion apparatus 110, an input current of the converter is not constant and has an AC component (such a current will be referred to as "low frequency ripple current" hereinafter) and such a low frequency ripple current has a bad influence upon the fuel cell connected to a front end of the converter.

When the current is not constant in this manner, the fuel cell is seriously affected unlike other general apparatuses. The ripple current reduces a life span of the fuel cell and deteriorates a performance of the fuel cell. Further, as the ripple current is increased, the life span of the fuel cell is greatly reduced and the performance of the fuel cell is greatly deteriorated, and sometimes, over current may cause a malfunction, such as an emergency stop of the fuel cell system.

The present disclosure is conceived to solve the above-described problems and provides a power conversion system capable of eliminating a low frequency ripple current generated by an inverter and having a very quick response characteristics to a rapid change in a load without any overshoot or undershoot, and a control method thereof.

In accordance with an aspect of the present disclosure, there is provided a power conversion system (PCS) that converts an output of a DC power supply received from an external power supply. The power conversion system includes: a converter that converts a voltage of the input power supply; an inverter that converts an output voltage of the converter into an AC voltage; and a converter control module that outputs a PWM signal for controlling a switch of the converter. After receiving a power instruction value, the converter control module may generate the PWM signal for controlling the converter based on the power instruction value.

Further, the power conversion system may further include a first sensor module that measures a voltage value and a current value. The converter control module may calculate a current instruction value by using the inputted power instruction value and the voltage value measured by the first sensor module, and generate the PWM signal for controlling the switch of the converter based on an error value between the current instruction value and the current value measured by the first sensor module.

Furthermore, the power conversion system may further include an inverter control module that outputs a PWM signal for controlling a switch of the inverter. After receiving a voltage instruction value, the inverter control module may generate a current instruction value based on the voltage instruction value and generate the PWM signal for controlling the inverter based on the generated current instruction value.

Further, the power conversion system may further include a second sensor module that measures a output voltage value of the converter and a third sensor module that measures a output current value of the inverter. The inverter control module may control an error value between the inputted voltage instruction value and the voltage value measured by the second sensor module to be zero and calculates a first current instruction value which makes the error value zero, obtain a feed-forward term by dividing the power instruction value received from the converter control module by a load voltage value and multiplies the feed-forward term by an estimation phase of a general electric power system, thereby obtaining a second current instruction value, and generate the PWM signal for controlling the switch of the inverter based on an error value between a third current instruction value obtained by adding the first current instruction value to the second current instruction value and the current value measured by the third sensor module.

Furthermore, the first sensor module may be installed between a fuel cell and the converter. The measured voltage value and current value may serve as a converter input voltage value and a converter input current value, respectively. The current instruction value may serve as a converter input current instruction value.

Further, the first sensor module may be installed between the converter and the inverter. The measured voltage value and current value may serve as a DC link voltage value and a DC link current value, respectively. The current instruction value may serve as a DC link current instruction value.

Furthermore, a voltage value measured by the second sensor module may serve as a DC link voltage value, and a voltage value measured by the third sensor module may serve as a inverter output current value.

Further, the external power supply is a fuel cell.

Furthermore, the converter may take any one of various forms such as a boost-type converter, a boost converter, a half-bridge converter, a full-bridge converter, and a push-pull converter so as to boost a low DC voltage to a DC voltage having a predetermined voltage level.

In accordance with another aspect of the present disclosure, there is provided a control method of a power conversion system (PCS) including a converter that converts a voltage of an input power supply, and an inverter that converts an output voltage of the converter into a AC voltage. The control method includes: receiving a power instruction value; and generating a PWM signal for controlling the converter based on the received power instruction value.

Further, the step of generating the PWM signal for controlling the converter may include: measuring a voltage value and a current value for controlling the converter; calculating a current instruction value by using the inputted power instruction value and the measured current value; and generating a PWM signal for controlling a switch of the converter based on an error value between the current instruction value and the measured current value.

Furthermore, the control method may further include receiving a voltage instruction value; and generating a PWM signal for controlling the inverter based on the voltage instruction value and the current instruction value which is calculated using the voltage instruction value.

Further, the control method may further include measuring a voltage value and a current value for controlling the inverter; calculating a first current instruction value for allowing an error value between the inputted voltage instruction value and the measured voltage value to be zero; obtaining a feed-forward term by dividing the inputted power instruction value by a load voltage value, and multiplying the feed-forward term by a estimation phase of a general electric power system, thereby obtaining a second current instruction value, and generating the PWM signal for controlling the switch of the inverter based on an error value between a third current instruction value obtained by adding the first current instruction value to the second current instruction value and the measured current value.

Further the measured voltage value and current value may serve as a converter input voltage value and a converter input current value, respectively, and the current instruction value may serve as a converter input current instruction value.

Furthermore, the measured voltage value and current value may serve as a DC link voltage value and a DC link current value, respectively, and the current instruction value may serve as a DC link current instruction value.

Further, the measured voltage value may serve as a DC link voltage value, and the measured current value may serve as an inverter output current value.

In accordance with still another aspect of the present disclosure, there is provided a program stored in a computer-readable storage medium that executes a control method of a power conversion system (PCS) including a converter for converting a voltage of an input power supply, and an inverter for converting an output voltage of the converter into an AC voltage. The program includes: receiving a power instruction value; and generating a PWM signal for controlling the converter based on the received power instruction value.

Further, the step of generating the PWM signal for controlling the converter may include: measuring a voltage value and a current value for controlling the converter; calculating a current instruction value by using the received power instruction value and the measured current value; and generating a PWM signal for controlling a switch of the converter based on an error value between the current instruction value and the measured current value.

Furthermore, the program may further include receiving a voltage instruction value; and generating a PWM signal for controlling the inverter based on the voltage instruction value and the power instruction value.

As described above, in accordance with the present disclosure, there is provided a new control method of eliminating a low frequency ripple current in a power conversion apparatus.

According to the present disclosure, if a control method of the power conversion apparatus is changed, it is possible to completely eliminate the low frequency ripple current without any additional hardware or cost.

Further, a converter controls a current and an inverter controls a DC link voltage and an inverter output current by means of an input power instruction instead of a conventional algorithm for controlling a current and a voltage in a converter.

BRIEF DESCRIPTION OF THE DRAWINGS

The disclosure may best be understood by reference to the following description taken in conjunction with the following figures.

DETAILED DESCRIPTION OF THE INVENTION

Figure 3:
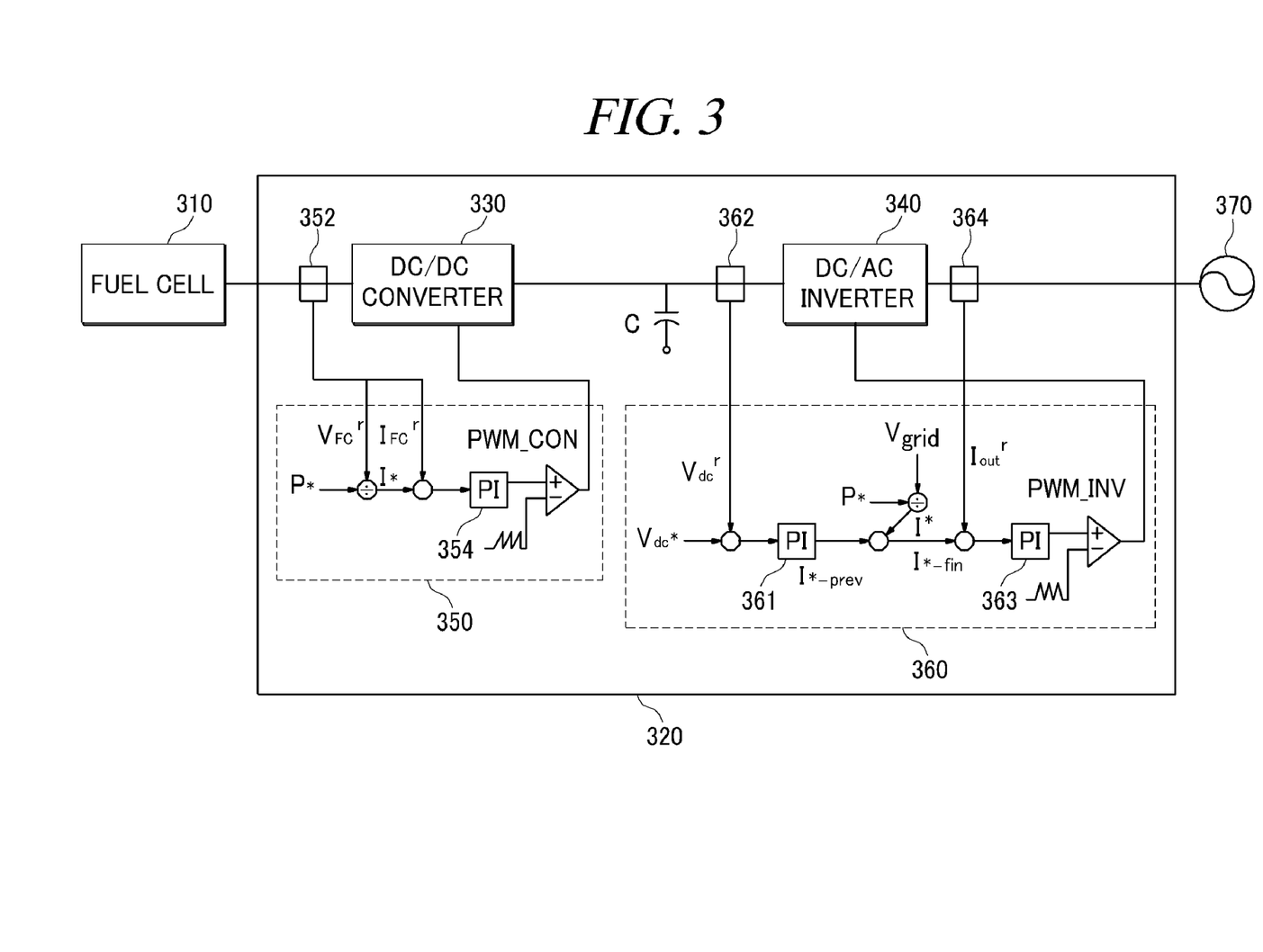
FIG. 3 is a block diagram showing a configuration of a fuel cell system including a power conversion apparatus in accordance with an embodiment of the present disclosure.

FIG. 3 is a block diagram showing a configuration of a fuel cell system including a power conversion apparatus in accordance with an embodiment of the present disclosure.

As shown in FIG. 3, a fuel cell system in accordance with an embodiment of the present disclosure is made up of a fuel cell 310, a power conversion apparatus 320, and a load 370. The power conversion apparatus 320 includes a DC/DC converter 330 (hereinafter, referred to as "converter"), a DC/AC inverter 340 (hereinafter, referred to as "inverter"), a converter control module 350 that generates a control signal of the converter 330, a first sensor module 352 that measures a voltage and a current to be inputted to the converter 330, an inverter control module 360 that generates a control signal of the inverter 340, a second sensor module 362 that measures a voltage to be inputted to the inverter 340, and a third sensor module 364 that measures a current to be outputted from the inverter 340.

As described above, the power conversion apparatus 320 receives a power from the fuel cell 310, suitably converts the power, and supplies the converted power to the load 370.

In this process, the converter 330 boosts and outputs a DC voltage generated from the fuel cell 310. Then, the inverter 340 converts the DC voltage outputted from the converter 330 into an AC voltage and applies the AC voltage to each load.

Since the configurations of the converter 330 and the inverter 340 will be easily understood by those skilled in the art, detailed descriptions thereof are omitted.

Hereinafter, the voltage and the current outputted from the converter and to be inputted into the inverter 340 will be referred to as a DC link voltage and a DC link current, respectively.

In the present disclosure, the converter control module 350 controls the converter 330 so that the low frequency ripple current can not be generated from the fuel cell 310.

To be specific, the converter control module 350 receives a power instruction value P* from a user. Then, a converter input voltage value $V_{FC}^r$ is measured by the first sensor module 352. Thereafter, a current instruction value I* is calculated by dividing the power instruction value P* by the converter input voltage value $V_{FC}^r$. Subsequently, the converter control module 350 measures a converter input current value $I_{FC}^r$ by using the first sensor module 352.

Based on an error value between the current instruction value I* and the converter input current value $I_{FC}^r$, a PI controller 354 generates a control signal PWM_CON. The control signal PWM_CON is compared to a reference voltage $V_{ref1}$ through a comparison unit 354 and a value of the compared result is then transmitted to a switch (not shown) of the converter 330. That is, in response to the control signal PWM_CON, it is possible to control the switch (not shown) of the converter 330, whereby the converter input current value $I_{FC}^r$ can be kept to correspond to the current instruction value I*. Resultantly, the low frequency ripple current components can be eliminated.

Then, the inverter control module 360 performs a dual-loop control for controlling an inverter input voltage and an inverter output current. To be specific, a PI controller of the inverter control module 360 performs a control action based on an error value between a DC link voltage instruction value $V_{dc}^*$ inputted by the user and a DC link voltage $V_{dc}^r$ measured by the second sensor module 362. That is, PI controller 361 controls an error value between the DC link voltage instruction value $V_{dc}^*$ and the DC link voltage $V_{dc}^r$ to be zero. And, PI controller 361 calculates a first current instruction value I*_prev which makes the error value zero.

Further, a feed-forward term $P^*/V_{grid}$ is obtained by dividing the power instruction value P* by a load voltage value $V_{grid}$ and a second current instruction value I* is obtained by multiplying the obtained feed-forward term $P^*/V_{grid}$ by an estimation phase value generated from the general electric power system. Then, based on an error value between a final current instruction value I*_fin obtained by adding the first current instruction value I*_prev to the second current instruction value I* and an inverter output current value $I_{out}^r$ measured by the third sensor module 364, a PI controller 363 generates a control signal PWM_INV. The control signal PWM_INV is compared to a reference voltage $V_{ref2}$ through a comparison unit 365 and a value of the compared result is then transmitted to a switch (not illustrated) of the inverter 340. That is, in response to the control signal PWM_INV, it is possible to control the switch (not illustrated) of the inverter 340. The inverter control module 360 performs a dual-loop control for controlling a DC link voltage and the inverter output current.

Unlike conventional power conversion apparatuses, the present power conversion apparatus 320 using the converter control module 330 and the inverter control module 340 removes the low frequency ripple current through the converter 330, keeps the inverter output current constant, and also controls an output power to be outputted to the load (general electric power system) as desired by the user.

A method of controlling the converter control module 350 and the inverter control module 360 will be described in detail with reference to FIGS. 4 and 5.

Figure 4:
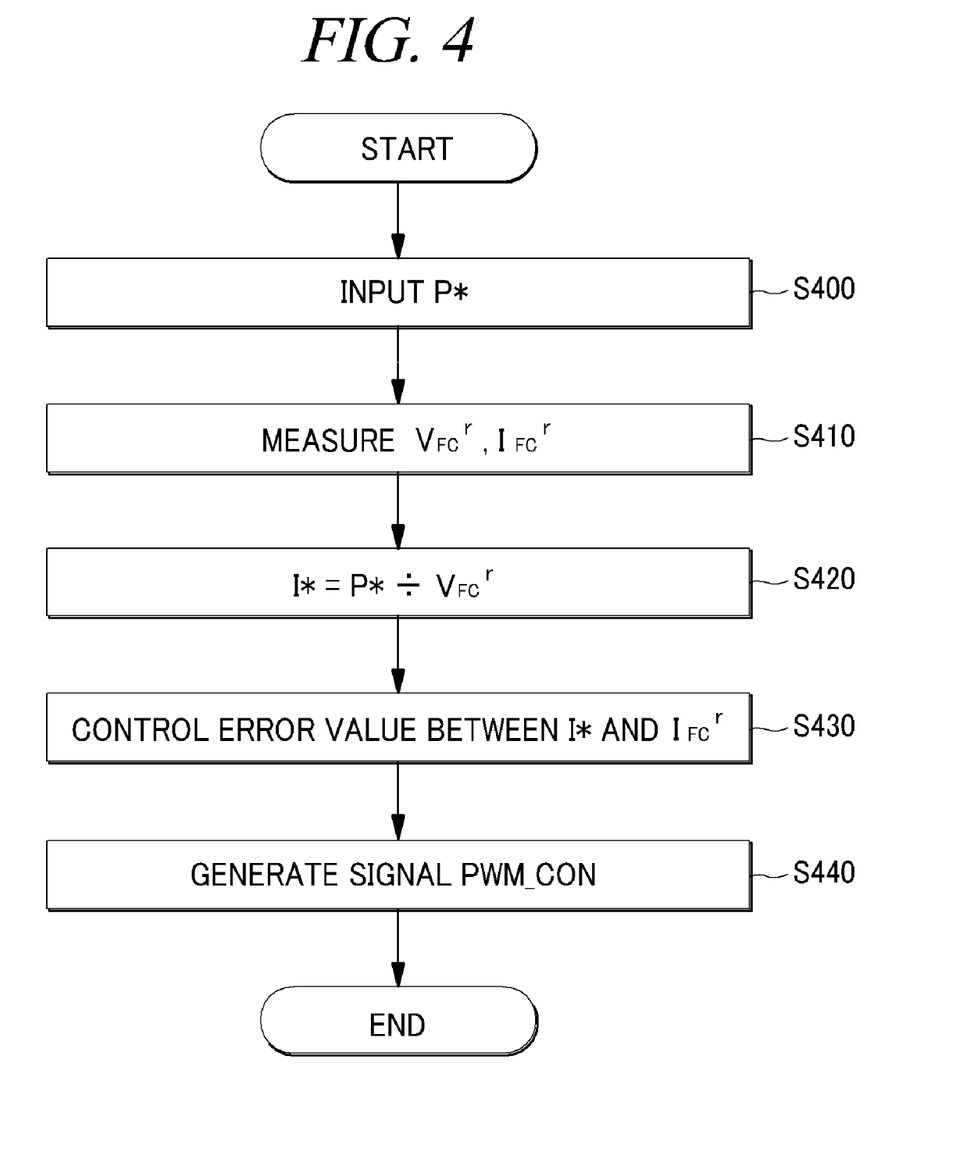
FIG. 4 is a flowchart illustrating a method of controlling a converter in a power conversion apparatus in accordance with an embodiment of the present disclosure.

FIG. 4 is a flowchart illustrating a method of controlling a converter in a power conversion apparatus in accordance with an embodiment of the present disclosure.

A sequence of controlling the converter is as follows.

Firstly, a user inputs a power instruction value P* (step S400).

Then, a first sensor module measures a converter input voltage value $V_{FC}^r$ and a converter input current value $I_{FC}^r$ (step S410).

Subsequently, a current instruction value I* is calculated by dividing the power instruction value P* by the converter input voltage value $V_{FC}^r$ (step S420).

Thereafter, by comparing the converter input current value $I_{FC}^r$ measured by the first sensor module 352 to the current instruction value I* calculated in step S420, an error value therebetween is obtained (step S430).

Based on the error value, the control signal PWM_CON is generated (step S440). In response to the control signal PWM_CON, it is possible to control a switch of the converter 330, whereby the converter input current value $I_{FC}^r$ can be kept to correspond to the current instruction value I*. Resultantly, the low frequency ripple current components can be eliminated.

Figure 5:
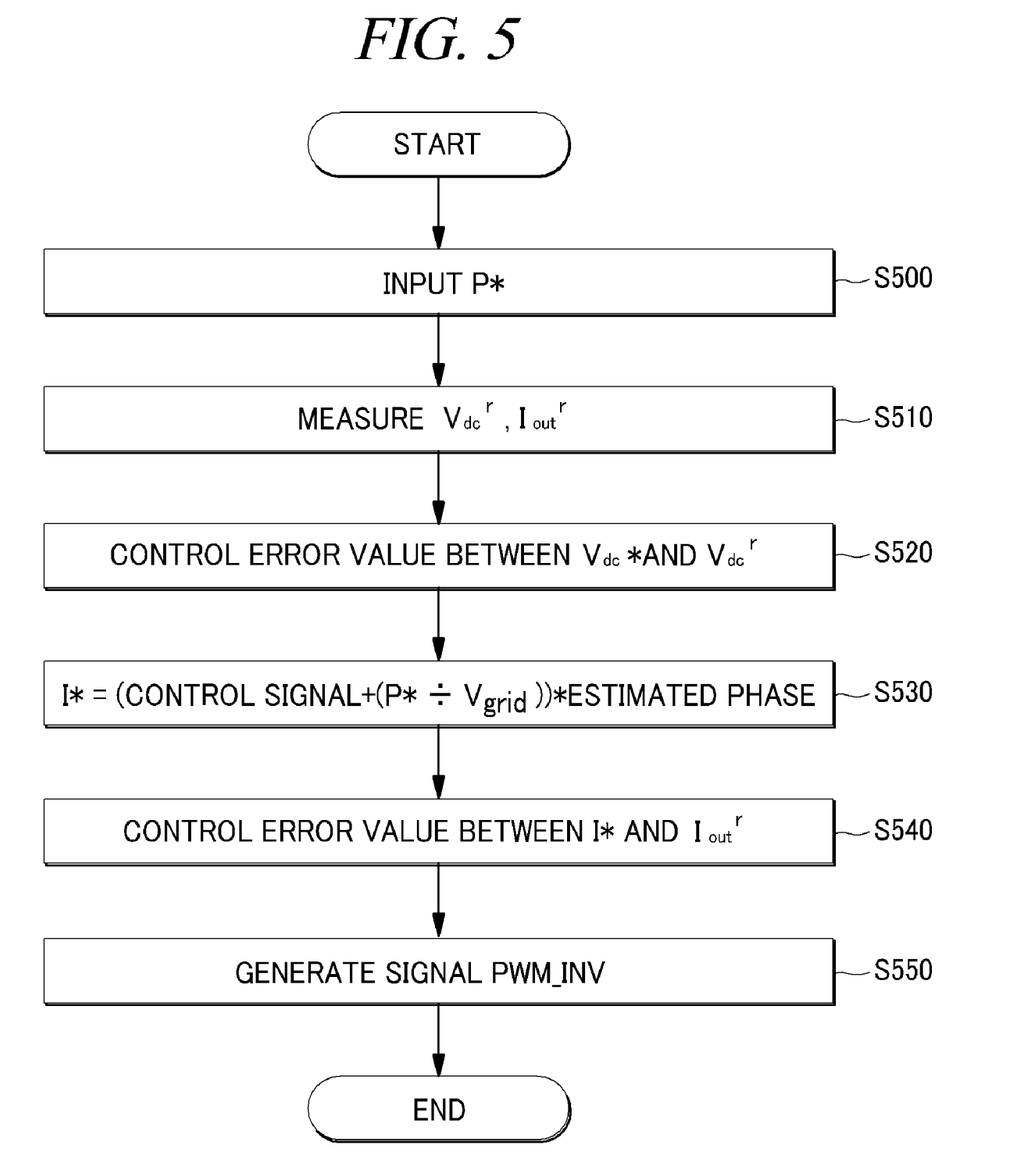
FIG. 5 is a flowchart illustrating a method of controlling an inverter in a power conversion apparatus in accordance with an embodiment of the present disclosure.

FIG. 5 is a flowchart illustrating a method of controlling an inverter in a power conversion apparatus in accordance with an embodiment of the present disclosure.

The converter control module 350 performs a single-loop control for controlling the converter input current value $I_{FC}^r$, whereas the inverter control module 360 performs a dual-loop control for controlling the DC link voltage value $V_{dc}^r$ and the inverter output current value $I_{out}^r$.

Firstly, the inverter voltage instruction value $V_{dc}^*$ is inputted (step S500).

Then, the DC link voltage value $V_{dc}^r$ and the inverter output current value $I_{out}^r$ are measured.

Subsequently, based on an error value between the DC link voltage instruction value $V_{dc}^*$ and the DC link voltage value $V_{dc}^r$ measured by the second sensor module 362, the first current instruction value I*_prev is calculated (step S520).

Thereafter, a feed-forward term is calculated by dividing a power instruction value P* inputted into the converter 330 by a load voltage value $V_{grid}$, and a second current instruction value I* is obtained by multiplying the obtained feed-forward term by an estimation phase generated from the general electric power system (step S530).

An error value between the final current instruction value I*_fin obtained by adding the first current instruction value I*_prev obtained in step S520 to the second current instruction value I* and the inverter output current value $I_{out}^r$ measured by the third sensor module 364 is calculated (step S540).

Then, based on the error value, a control signal PWM_INV is generated (step S550). In response to the control signal PWM_INV, it is possible to control a switch of the inverter 340 and perform a dual-loop control for controlling the DC link voltage and the inverter output current.

Figure 6A:
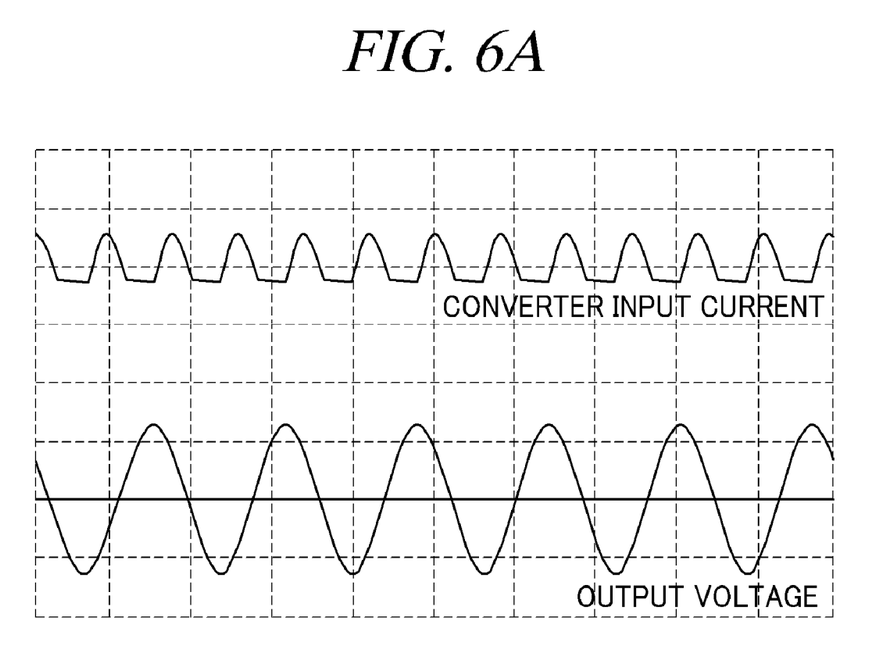
FIG. 6A is a view showing an actually measured waveform of a generated low frequency ripple current in case of using a conventional power conversion apparatus.

FIG. 6A is a view showing an actually measured waveform of a generated low frequency ripple current in case of using a conventional power conversion apparatus.

As shown in FIG. 6A, it can be seen that a ripple occurs in an inputted current in case of using the conventional power conversion apparatus. The ripple current has a bad influence upon a fuel cell.

Figure 6B:
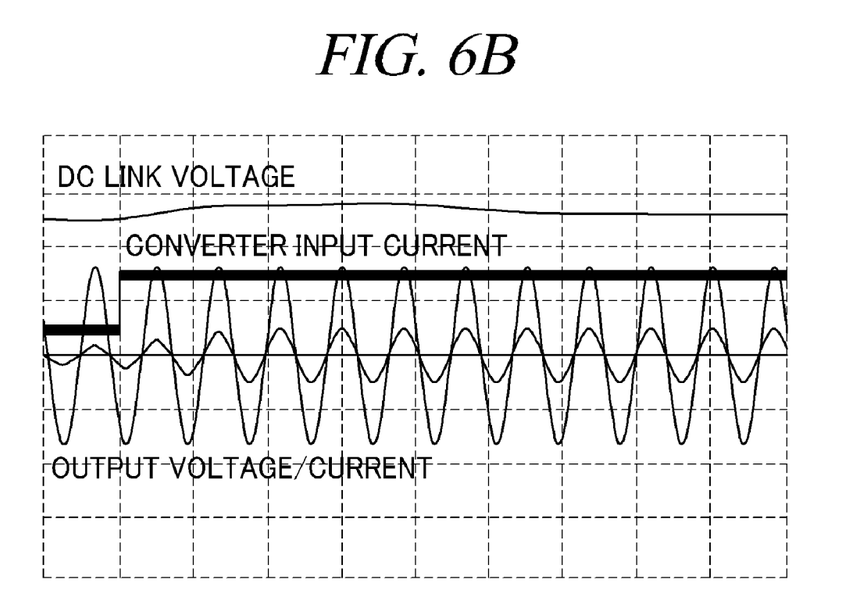
FIGS. 6B and 6C are views showing an actually measured waveform in case of using a power conversion apparatus in accordance with an embodiment of the present disclosure.
Figure 6C:
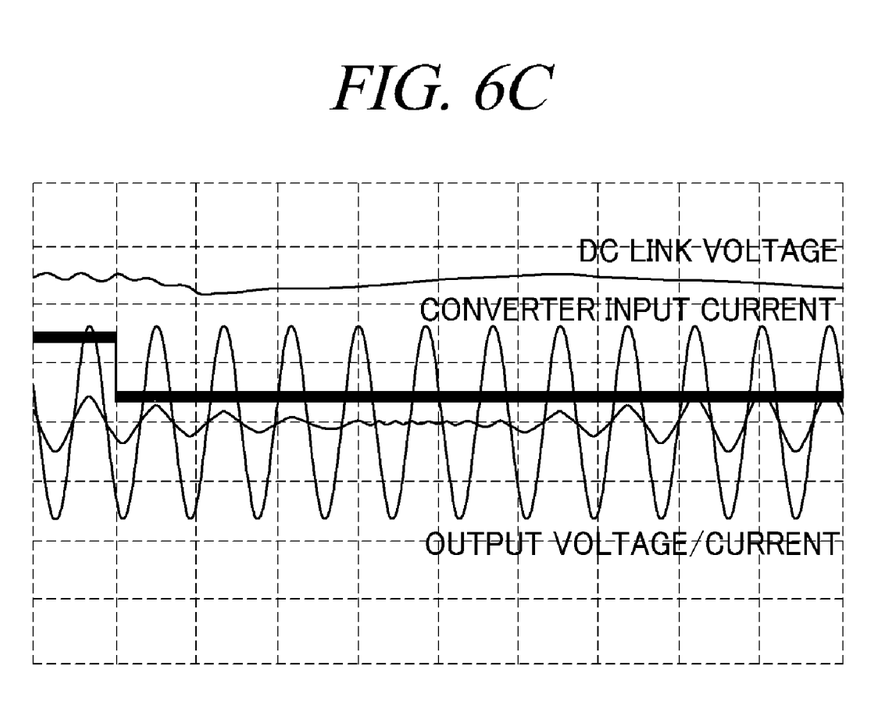

FIGS. 6B and 6C are views showing an actually measured waveform in case of using a power conversion apparatus in accordance with an embodiment of the present disclosure.

Here, FIG. 6B shows a waveform in case that a load level is increased from about 300 [W] to about 1000 [W], and FIG. 6C shows a waveform in case that a load level is decreased from about 1000 [W] to about 300 [W]. As can be seen from these drawings, in case of using the power conversion apparatus of the present disclosure, a low frequency ripple current is completely eliminated.

Further, it can be seen from the waveforms that even though the load is rapidly changed, its dynamic characteristics are excellent and the DC link voltage and the output power are controlled in normal order.

In the present embodiment, there has been described a configuration in which the converter control module and the inverter control module are installed independently and separately from the converter and the inverter, respectively. However, such a description is merely provided as an example for the convenience of illustration. The converter control module and the inverter control module may be included in the converter and the inverter, respectively. Further, the converter control module and the inverter control module may be configured as a single control module. The present disclosure can be applied to any configuration or arrangement of these control modules.

Furthermore, in the present embodiment, the fuel cell is provided as an example of an external input power supply, but the present disclosure can be applied to any kind of a power supply apparatus, other than the fuel cell, suitable for the power conversion apparatus.

While the present disclosure has been described with respect to the embodiments, it is not limited to the above-described embodiments. Further, it will be understood by those skilled in the art that various changes and modifications can be made in the cope of the claims without changing essential features of the present disclosure, and such changes and modifications shall not be understood independently of technical conception or prospect of the present disclosure.

What is claimed is:

1. A power conversion system (PCS) that converts an output of a DC power supply received from an external power supply, the power conversion system comprising:
   a converter that converts a voltage of the input power supply;
   an inverter that converts an output voltage of the converter into an AC voltage;
   a converter control module that outputs a PWM signal for controlling a switch of the converter;
   an inverter control module that outputs a PWM signal for controlling a switch of the inverter;
   a first sensor module that measures a voltage value and a current value; and
   a second sensor module that measures a output voltage value of the converter and a third sensor module that measures a output current value of the inverter,
   wherein after receiving a power instruction value, the converter control module generates the PWM signal for controlling the converter based on the power instruction value and
   wherein after receiving a voltage instruction value, the inverter control module
   controls an error value between the voltage instruction value and the voltage value measured by the second sensor module to be zero and calculates a first current instruction value based on the error value,
   obtains a feed-forward term by dividing the power instruction value received from the converter control module by a load voltage value and multiplies the feed-forward term by an estimation phase of a general electric power system, thereby obtaining a second current instruction value, and
   generates the PWM signal for controlling the switch of the inverter based on an error value between a third current instruction value obtained by adding the first current instruction value to the second current instruction value and the current value measured by the third sensor module.

2. The power conversion system of claim 1, wherein the converter control module calculates a current instruction value by using the power instruction value and the voltage value measured by the first sensor module, and generates the PWM signal for controlling the switch of the converter based on an error value between the current instruction value and the current value measured by the first sensor module.

3. The power conversion system of claim 2, wherein the first sensor module is installed between a fuel cell and the converter,
   the measured voltage value and current value serve as a converter input voltage value and a converter input current value, respectively, and the current instruction value serves as a converter input current instruction value.

4. The power conversion system of claim 2, wherein the first sensor module is installed between the converter and the inverter, the measured voltage value and current value serve a DC link voltage value and a DC link current value, respectively, and the current instruction value serves as a DC link current instruction value.

5. The power conversion system of claim 1, wherein a voltage value measured by the second sensor module serve as a DC link voltage value, and a voltage value measured by the third sensor module serve as a inverter output current value.

6. The power conversion system of claim 1, wherein the external power supply is a fuel cell.

7. The power conversion system of claim 1, wherein the converter takes any one of various forms such as a boost-type converter, a boost converter, a half-bridge converter, a full-bridge converter, and a push-pull converter so as to boost a low DC voltage to a DC voltage having a predetermined voltage level.

8. A control method of a power conversion system (PCS) including a converter that converts a voltage of an input power supply, and an inverter that converts an output voltage of the converter into a AC voltage, the control method comprising:

receiving a power instruction value and a voltage instruction value;

generating a PWM signal for controlling the converter based on the received power instruction value; and generating a PWM signal for controlling the inverter based on the voltage instruction value and a current instruction value which is calculated using the voltage instruction value, wherein the step of generating the PWM signal for controlling the inverter includes:

measuring a voltage value and a current value for controlling the inverter;

calculating a first current instruction value for allowing an error value between the voltage instruction value and the measured voltage value to be zero;

obtaining a feed-forward term by dividing the power instruction value by a load voltage value, and multiplying the feed-forward term by a estimation phase of a general electric power system, thereby obtaining a second current instruction value, and generating the PWM signal for controlling the switch of the inverter based on an error value between a third current instruction value obtained by adding the first current instruction value to the second current instruction value and the measured current value.

9. The control method of claim 8, wherein the step of generating the PWM signal for controlling the converter includes:

measuring a voltage value and a current value for controlling the converter;

calculating a current instruction value by using the power instruction value and the measured current value; and generating a PWM signal for controlling a switch of the converter based on an error value between the current instruction value and the measured current value.

10. The control method of claim 9, wherein the measured voltage value and current value serve as a converter input voltage value and a converter input current value, respectively, and the current instruction value serves as a converter input current instruction value.

11. The control method of claim 9, wherein the measured voltage value and current value serve as a DC link voltage value and a DC link current value, respectively, and the current instruction value serves as a DC link current instruction value.

12. The control method of claim 8, wherein the measured voltage value serves as a DC link voltage value, and the measured current value serves as an inverter output current value.

13. A program stored in a computer-readable storage medium that executes a control method of a power conversion system (PCS) including a converter for converting a voltage of an input power supply, and an inverter for converting an output voltage of the converter into an AC voltage, the program comprising:

receiving a power instruction value and a voltage instruction value;

generating a PWM signal for controlling the converter based on the received power instruction value; and generating a PWM signal for controlling the inverter based on the voltage instruction value and a current instruction value which is calculated using the voltage instruction value, wherein the step of generating the PWM signal for controlling the inverter includes:

measuring a voltage value and a current value for controlling the inverter;

calculating a first current instruction value for allowing an error value between the voltage instruction value and the measured voltage value to be zero;

obtaining a feed-forward term by dividing the power instruction value by a load voltage value, and multiplying the feed-forward term by a estimation phase of a general electric power system, thereby obtaining a second current instruction value, and generating the PWM signal for controlling the switch of the inverter based on an error value between a third current instruction value obtained by adding the first current instruction value to the second current instruction value and the measured current value.

14. The program of claim 13, wherein the step of generating the PWM signal for controlling the converter includes:

measuring a voltage value and a current value for controlling the converter;

calculating a current instruction value by using the received power instruction value and the measured current value; and generating a PWM signal for controlling a switch of the converter based on an error value between the current instruction value and the measured current value.

15. The program of claim 13, further comprising: receiving a voltage instruction value; and generating a PWM signal for controlling the inverter based on the voltage instruction value and the power instruction value.

* * * * *